May 3, 1960

E. G. BEARD 2,934,998

PROJECTION SCREEN

Filed May 12, 1953

INVENTOR:
ERNEST GORDON BEARD
BY Leon M. Strauss
AGT.

May 3, 1960 E. G. BEARD 2,934,998
PROJECTION SCREEN
Filed May 12, 1953 2 Sheets-Sheet 2

INVENTOR:
ERNEST GORDON BEARD
BY Milton M. Strauss
AGT.

United States Patent Office 2,934,998
Patented May 3, 1960

2,934,998

PROJECTION SCREEN

Ernest Gordon Beard, Willoughby, near Sydney, New South Wales, Australia

Application May 12, 1953, Serial No. 354,571

Claims priority, application Australia May 14, 1952

3 Claims. (Cl. 88—28.93)

Projection screens according to this invention are screens of transparent or of light-reflecting material, and have fine lines or grooves inscribed on their surfaces, said lines or grooves forming sets of concentric circles and each set being formed on a different centre. The lines or grooves are of somewhat indefinite cross-section although the cross-section of aggregates of the lines may to some extent be controlled for particular purposes.

Screens according to the invention are based primarily on the principles outlined in my United States Patent No. 2,716,919 (application Ser. No. 63,317) which are summarised in the following, but the emphasis in this specification is on projection screens for flat, i.e. two-dimensional pictures, although the same principles apply to projection screens for stereoscopic and other three-dimensional pictures as well, and to the method of making same.

If according to Patent No. 2,716,919 the surface of a transparent or reflecting plane sheet of material is formed with a set of concentric lenticulations, an image projected on to said surface is visible to a file of observers located in a line that makes an angle with the normal passing through the centre of said lenticulations, which angle is equal and opposite to the angle between the normal passing through the centre of said lenticulations and a line joining said centre to the lens of the projector.

If two or more transparent screens of this kind are superimposed with the centres of the lenticulations displaced relatively to each other or out of alignment, or if two or more sets of concentric lenticulations are formed on a single surface around different centres, the image projected thereon is visible to files of observers the position of which in respect to each said centre is determined in the manner stated above in relation to a single centre.

Furthermore, interaction may occur between the sets of elements so that a bright image is visible to observers located between these files. Such interaction is admissible if the screen is used for the observation of flat, i.e. two-dimensional pictures, but it must be avoided if stereoscopic pictures are projected on the screen.

It has been found that very satisfactory screens of this type may be manufactured by producing on said surfaces concentric, arcuate lines of very small width. Moreover it has been established that, unless these grooves are of random size and/or distribution, the screen would show an unwanted colour spectrum. It is not known for sure how these grooves operate, but they may work by reflection, refraction or diffraction, or by some combination of these actions.

According to the present invention a projection screen comprises a sheet having a surface provided with a plurality of sets of concentric circular grooves, each set having a different center located beyond the sheet in the plane of said sheet and at a finite distance therefrom, the grooves of each set being of random spacing and cross-section and being indistinguishable to an observer at a predetermined distance from the sheet, and said sets of grooves respectively extending entirely over said sheet surface and respectively deflecting light from a projector forming an image on said sheet in a manner rendering said image visible in its entirety only to observers having their eyes in conical spaces the apexes of which respectively coincide with the centers of said sets of grooves, the axes of which pass through the lens of the projector. The grooves are of narrow width and whilst grooves discernible by normal vision are within the scope of this invention, the number of grooves counted in radial direction may be of the order of 2,000 to the inch. In actual practice numbers from about 5,000 to about 20,000 and more grooves to the inch have been achieved.

While the cross-sectional shape of these grooves thus is indeterminate, it has been found possible to shape aggregates of these microscopic grooves in such a manner as to result in a considerable increase of light efficiency. This is due to the random width and cross section of the grooves in combination with the large number per unit area of said grooves which because of statistical probability account for the presence in practically every surface element equal to or smaller than that which can be resolved by the eyes of the nearest observer, of directed specular groove elements inclined to the general plane of the screen surface at practically any angle.

If the screen is made of transparent material of sets of concentric circular grooves may be provided on at least one of the opposite surfaces of said sheet, but preferably they are provided on both surfaces.

Particularly where the number of sets of concentric circular grooves formed about different centers is large, it is of advantage to superpose a number of transparent sheets, i.e. two or more such sheets, to constitute a composite screen, each sheet of said composite screen being provided with at least one set of said concentric circular grooves on at least one of its surfaces, and the centers of the sets of grooves being spaced from each other and being located substantially in the plane of the composite sheet beyond its confines and at finite distances therefrom.

A reflecting screen according to the present invention may also be made by applying to one side of a transparent sheet a specular reflecting layer serving as a backing means for said sheet.

The grooves may be inscribed economically and rapidly by moving over the surface of the sheet or the like to be formed into a screen, such means as brushes, combs, pads or strips of flexible material such as leather, with or without abrasives, or metal. The nature of the grooves so formed is determined by the nature of the inscribing means, of the abrasive if any, of whether or not a lubricant is used and if so, of the nature of such lubricant; of the pressure applied by the inscribing means upon the surface; and it depends further on the speed at which the inscribing means are passed over the surface, and on the number of strokes of the inscribing means over the surface. All these may be adapted to the particular purpose of the screen.

Thus, for instance, the screen and the inscribed grooves appear to be somewhat "matted" if the lubricating medium (e.g. kerosene) forms the abrasive grains into aggregates as then the diffusion of light occurs generally in more than one plane, the angle containing these planes depending in part on the nature of the lubricant. The screen and grooves, however, may appear highly polished if, for instance, water or a lubricant of a consistency forming a stable suspension of the abrasive is used, in which case dispersion takes place substantially in a single plane.

Levigated aluminum oxide has been found to be a very suitable abrasive whilst brushes formed of horsehair have proved to be particularly suitable as inscribing means.

Screens formed by these means may be divided into two broad classes which may be termed for convenience as fully formed screens and partially formed screens, respectively. Fully formed screens made of transparent material, although in fact transparent, appear translucent to the eyes. Partially formed screens of transparent material, on the other hand, permit a considerable portion of the incident light to pass through or to be reflected without being deviated by the grooves on the screen.

Characteristics of screens made according to the invention largely depend on the manner in which different sets of concentric microgrooves are combined. Screens can be manufactured according to this invention to direct the light from the image of the picture on the screen into a viewing beam having almost any desired horizontal or vertical angular width.

Generally, the horizontal and vertical angles of the viewing beam depend upon the distance of the projector from the screen and upon the overall space occupied by the centres upon which the sets of grooves are formed. The viewing beam is approximately the solid angle defined by lines joining the projector lens to the outermost centres of the sets of concentric elements which form the screen.

When a transparent screen is composed of fully formed sets, it is possible to use a number of superimposed surfaces with one or more sets of grooves on each surface. Often it is only necessary to use two sets of fully formed grooves to cover any specified horizontal viewing beam angle, the centres of the sets being arranged towards the outer edges of the desired viewing beam angle. The useful viewing angle is somewhat larger than that defined by the actual centres of the sets. In some cases described hereafter it may be necessary to use more than two sets of grooves.

When a screen is composed of partially formed sets of grooves, it is preferable to form a number of sets on each surface, on centres spread over the desired viewing beam angle. Preferably the separation between adjacent centres should be less than the diameter of the projector lens, but interaction between the different sets of grooves enables this separation to be increased. In general it is found that the angle at the projector lens subtended by the separation between the centres of two sets of grooves should not considerably exceed four times the angle subtended by the projector lens at a point on the screen.

It has been established that, as might be expected, the angle through which a ray of light from the projector can be deflected by an inscribed groove on the screen is limited, the general maximum deviation being of the order of 30°. Hence when the viewing beam approaches 60°, or if the projector or observers are so located that the angle to the farthermost edge of the screen subtended by the projector or observer and the plane of the screen approaches 60° the brightness of the picture at the far edge of the screen rapidly decreases.

This defect can be minimised by superimposing a second and possibly a third screen carrying sets of microscopic grooves on centres so located as to suitably increase the deviation caused by the screen lines for the angle concerned.

When using partially formed sets of grooves, and sometimes with fully formed sets, it is preferable to superimpose upon each other a number of surfaces carrying sets of grooves, in order to smooth out any irregularities which may occur in a single set of grooves.

With screens formed with sets of grooves of indeterminate cross section a considerable portion of the light is deviated in directions directly away from the centre of each set.

The efficiency of screens according to this invention may be increased by forming aggregates of microscopic grooves formed within conical, or approximately conical, furrows on the screen surface. This can be accomplished by using as the inscribing means a comb with suitably shaped teeth, or a brush with a fine-grained abrasive applied thereto. Each tooth or bristle then makes an aggregate of microscopic grooves on the screen.

Similarly, when it is desired to form sets of grooves with as little interaction between the different sets as possible, for example for the projection of stereoscopic images, the inscribing means may be a comb with spaced teeth.

The viewing beam angle of a screen may be increased by superimposing upon the screen a surface on which parallel lines or grooves are inscribed, such parallel lines or grooves being equivalent to concentric circles having an infinitely large radius. This surface also may be formed by the method according to the present invention.

In order to form the sets of grooves, one or more inscribing means such as abrasive pads, combs or the like may be attached to one or more than one arm, said arm or arms being pivotally attached to the stationary base and to the opposite side respectively of a pantograph frame structure the lateral sides of which are parallel to said arm or arms and are pivotable in relation to said base. Alternatively the surface to be inscribed may be mounted on a table rotated around a suitable centre with the inscribing means being stationary and resting on the surface.

Almost any transparent or reflecting material can be used for the manufacture of screens according to this invention, but cellulose acetate has been found to acquire a high polish in the lines and to be remarkably easy to clean. Over a series of tests cellulose acetate has been found to produce screens which are approximately 0.1 log. lamberts brighter than similar screens formed of cellulose nitrate. For these reasons cellulose acetate is a particularly suitable material for the manufacture of screens according to this invention.

The material may be used as a film or as a lacquer on a transparent or specular reflecting base. Transparent screens may be used for front projection by mounting on a mirror surface which itself may, or may not, be formed with sets of grooves.

When inscribing grooves on a surface by means such as those envisaged in this invention (brushes, combs and the like), diverse effects can be obtained depending on the relationship maintained between these means and the rotatable arms to which they are attached.

Thus for example, if the inscribing means (e.g. a brush) is so attached that it moves as the radius of a circle, the bristles of the brush will inscribe a single set of concentric circles. If, however, the brush is attached pivotally to two rotating arms, the attaching pivots being equally spaced from the centres of rotation so that the brush is parallel to the line joining the centres of rotation, then the bristles of the brush will inscribe a number of sets of grooves having a multitude of centres lying in a space equal to the length of the brush and in line with the centres of rotation.

If, on the other hand, the brush is attached to the two rotating arms at points which are not the same distance from the respective centres of rotation the lines inscribed by the brush bristles will be somewhere between these two limiting formations.

Screens may be composd of combinations of sets of elements formed in these different ways, according to the purpose of the screen.

In order to more particularly describe the invention reference is made to the accompanying drawings which diagrammatically, and by way of example, illustrate various forms of screen elements according to this invention and the arrangement of such screens in relation to potential observers and to a projector, as well as certain means for making such projection screens or elements thereof.

Figure 1:
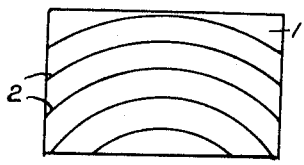
Fig. 1 shows in front elevation a screen provided with only one set of grooves concentric about a center outside the confines of the screen.

Referring in the first place to Fig. 1 of said drawings, same depicts a front view of a single unit or screen element 1 constituting the basis for a screen according to this invention. A specific screen of that type having highly polished surfaces is described in the specification of my United States Patent No. 2,716,919 (application Serial No. 63,317). The unit or element consists of a sheet of transparent material such as cellulose acetate on which are formed a number of grooves 2 of extremely narrow and random width, and of random spacing as well, on a common centre 3. As there may be from about 5,000 to 25,000 concentric, circular grooves to the inch, counted whilst progressing radially in relation to said grooves, it is impossible to show these grooves distinctly on the drawing, and individual grooves are therefore represented in Fig. 1 by a number of distinctly spaced arcs.

Figure 2:
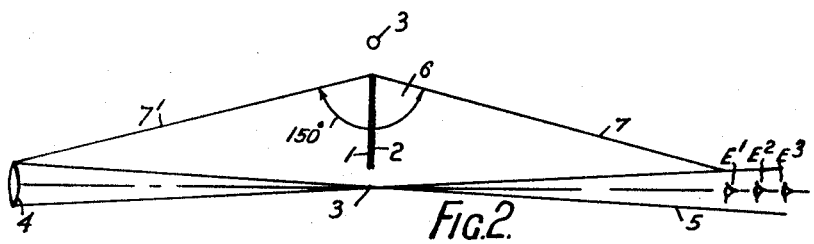
Figs. 2 and 3 shows the screen of Fig. 1 in sectional side elevation and sectional plan respectively, in relation to a projector represented in the drawing by a lens and to a number of viewers each represented by an eye.

Fig. 2 shows said screen element in cross section and for the purpose of illustration the grooves 2 are here represented, greatly exaggerated, by a series of indentations in the screen surface. Fig. 2 also shows schematically the arrangement of the screen 1 for the projection from a projector 4. The picture projected by the projector 4 on to the screen element 1 is clearly visible to a file of spectators each represented by one of a series of eyes $E_1$, $E_2$, $E_3$ . . ., all said spectators being located within a conical space 5 formed by lines drawn from the periphery of the projection lens 4 through the common centre 3 of the grooves 2 on the screen element 1, provided the observers are not too close to the projection screen.

Preferably the angle 6 between lines 7, 7' drawn from the farthermost edges of the screen to the projector and to the nearest observer respectively, should not be less than 150°. It will be noted that in this form of screen element the common centre 3 of the grooves 2 is in the plane of the screen element, but outside the screen area itself.

Figure 3:
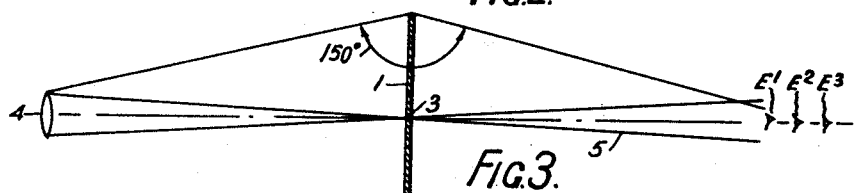

Fig. 3 illustrates the same screen element 1, and the projector 4 in plan view, and it also shows the position of the observers within the cone or viewing beam 5.

Figure 4:
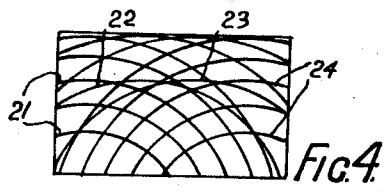
Figs. 4 and 5 show in front elevation and in sectional plan view, respectively, a screen according to the invention with a number of sets of grooves concentric about centers arranged outside the screen area and along a single line parallel to an edge of the screen, Fig. 5 illustrating the screen in its relationship to a projector represented by a single lens.
Figure 5:
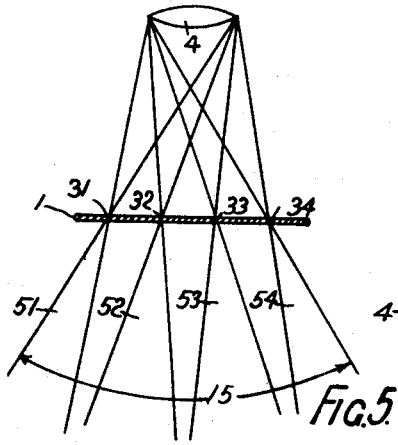

Figs. 4 and 5 of the drawing depict a screen element 1 consisting of a sheet of cellulose acetate formed with a number of sets of microgrooves 21, 22, 23, 24 of random spacing and cross section, formed on centres 31, 32, 33, 34 respectively, which are arranged in the plane of the element but outside the screen area itself. This screen when used with a single projector 4 in the position shown in Fig. 5 will result in the formation of a number of cones 51, 52, 53 and 54, each corresponding to the cone 5 of Figs. 2 and 3. If the distance between adjoining centres 31, 32, 33 and 34 is sufficiently small, e.g. less than the diameter of the projector lens aperture, these cones will partially merge, or overlap, at some distance from the screen 1, thus producing conjointly a flattened cone-like space or viewing beam 15 wherein a picture on the screen can clearly be seen. If the grooves of the sets are slightly matted, i.e. not highly polished, the picture will then be visible throughout that space 15 even though the distance betwen adjoining set centres 31, 32, 33 and 34 be as great as three or four times the diameter of the lens aperture. This is so if the dispersion of the grooves is in planes within a comparatively small angle containing the plane of maximum dispersion, e.g. within an angle of about 30°.

Figure 6:
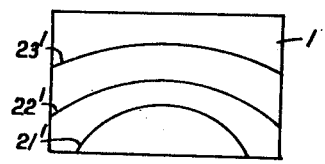
Figs. 6 and 7 illustrate in front elevation and in vertical cross-section, respectively, a screen provided with a number of sets of grooves concentric about centers arranged along a line underneath the lower edge of the screen and perpendicular to said edge, Fig. 7 illustrating the screen in its relationship to a projector again represented by a single lens.
Figure 7:
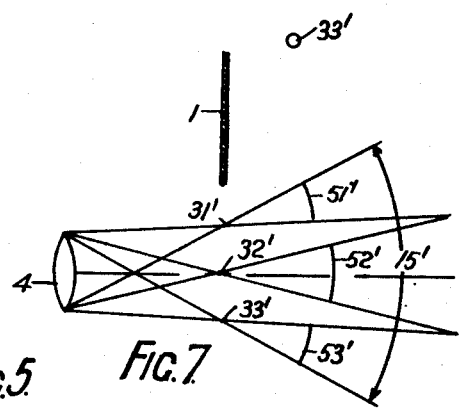

Figs. 6 and 7 show schematically only, a screen 1 made of a sheet of cellulose acetate which has formed thereon sets of concentric grooves 21', 22', 23' of random spacing and cross section, on centres 31', 32', 33' disposed vertically above each other. For the sake of clearness, only very few of the grooves are shown in Fig. 6 although it should be understood that in this case again the spacing between adjoining grooves of each set may be of the order of about 5,000 to about 25,000 to the inch. In Fig. 7 the grooves are not shown, but the figure illustrates the position of the projector 4 in relation to the screen element 1, and the formation of conical spaces 51', 52', 53' having their apices in said centres 31', 32' and 33' respectively. The eyes of observers may be located anywhere within the flattened cone-like space or viewing beam 15' which in this case is of comparatively narrow horizontal width defined by the diameter of the lens aperture but of larger width in vertical direction, the latter dimension being determined by the lens aperture as well as by the distance from one another of the outermost centres 31' and 33'. The freedom of movement of observers in this case is increased vertically, the action being otherwise analogous to that described with reference to Figs. 4 and 5.

Figure 8:
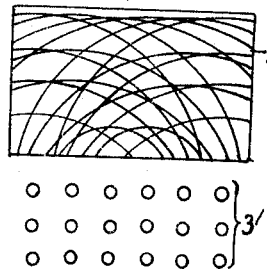
Figs. 8, 9 and 10 illustrate in front elevation, in side elevational section and in sectional plan, respectively, a screen according to the invention provided with sets of concentric grooves about centers arranged along horizontal and vertical lines, Figs. 9 and 10 illustrating the screen in its relationship to a projector represented by a single lens.
Figure 10:
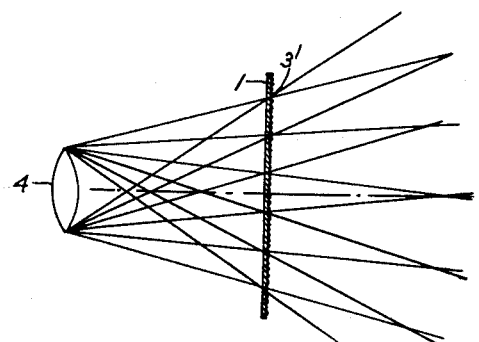
Figure 9:
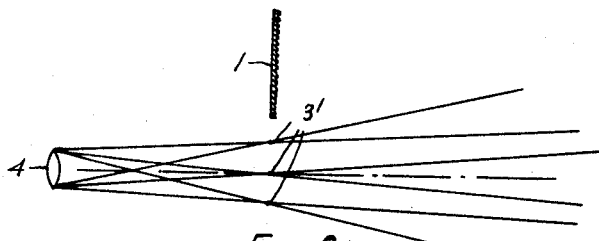

Fig. 8 shows diagrammatically a screen 1 on which are formed sets of microscopic grooves similar to those described above, each set being concentric in relation to one centre in a group 3' of centres, said centres being arranged, for instance, in three horizontal rows and in a number of vertical columns as shown. Figs. 9 and 10 show the vertical and horizontal dimension respectively of the viewing beam the cross sectional area of which is about rectangular in this case. The dimensions of the viewing beam are determined, approximately, by lines drawn from the periphery of the projector 4 through the outermost centres of the group 3'. In Fig. 8 again, only very few of the concentric elements are shown for the sake of clarity.

Figure 11:
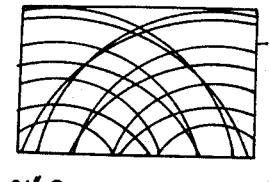
Fig. 11 shows in front elevation a screen according to the invention with grooves about centers arranged in a particular manner.

If the screen element or screen is fully covered with grooves, i.e. the entire surface or surfaces of the element are "formed," or if a number of partially formed transparent screen elements are superimposed, it has been found possible to eliminate all grooves centering around the inner centres of the group 3' shown in Fig. 8 and yet to achieve the same results as illustrated in Figs. 9 and 10 with a screen such as shown in front elevation in Fig. 11. That screen which also preferably consists of a sheet of cellulose acetate has formed on its surface sets of grooves concentric in relation to four centres 31", 32", 33", 34" outside the screen area and defining a rectangle and being in positions in relation to the screen 1 corresponding to the centres in the corners only of the group 3' of Fig. 8. The solid angle or viewing beam in which the picture can be seen is then substantially of rectangular pyramidal configuration, its dimensions being defined, approximately, by lines passing from the periphery of the projector lens 4 through the centres 31″, 32″, 33″ and 34″.

In practice it has been found convenient to depart somewhat from the rectangular distribution of the centres.

Figure 12:
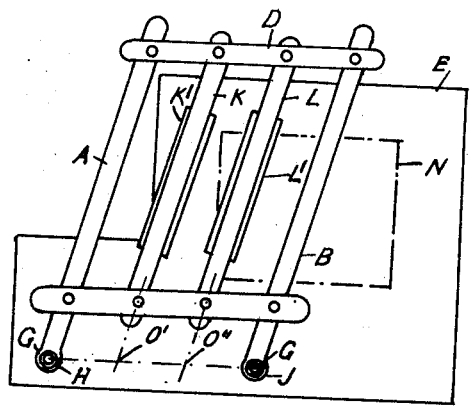
Figs. 12 and 13 illustrate diagrammatically a device for forming sets of grooves according to the invention on screens or on sheets being component parts of such screens, and part of a comb forming part of such device.

Fig. 12 of the drawings is a plan view showing diagrammatically only, one form of a device for forming sets of grooves on screens or screen elements according to this invention. This device comprises two parallel arms A and B interlinked with each other by means of two parallel transverse beams C and D, the arms and transverse beams constituting a pantograph frame structure disposed horizontally above a working table E. The arms A, B are pivotable on vertical pins F and G respectively which stand up from the table E, by means of corresponding eyes or bearings H and J.

Attached to the transverse beams C and D are, for instance two, spaced bars K, L each said bar carrying an elongated abrasive pad K′, L′ respectively. As the arms A, B are moved to and fro around the pivots F and G respectively, either by hand or mechanically, the pads move as radii of circles having spaced centres O′ and O″ respectively, on the lines interconnecting the pins F and G.

For operation a sheet M of suitable material such as cellulose acetate is placed on the table E and temporarily secured thereto, for instance by spring clips, below the abrasive pads K′, L′ in the desired relationship to the centres O′, O″. When the arms A, B are moved to and fro over the sheets, the pads form two sets of fine grooves concentric with respect to the points O′, O″.

A pattern of grooves according to Fig. 11 can be produced with the aforedescribed device in two series of operations, e.g. with the sheet N first in one position on the table E, and then reversed, i.e. with its opposite side up and the sides *a*, *b* of the sheet exchanged, so that the centres O′, O″ correspond first to the centres 31″ and 33″ of Fig. 11 and in the second operational phase to the centres 32″ and 34″. For more than two sets of microscopic grooves in an arrangement corresponding either to that shown in Fig. 4 or in Fig. 6 of the drawings, a larger number of pad-carrying bars is disposed on the pantograph frame. In order to enable a sweep of the arms through a wide angle the pads K, L should be properly spaced and/or of sufficiently narrow width.

It has been found that pads composed of horsehair brushes, and an abrasive consisting of a mixture of levigated aluminum oxide and kerosene are suitable for general purposes. This abrasive constitutes an "unstable suspension" in the kerosene according to the definition of that term given by Troelstra in a paper on "Applying Coating by Electrophoresis" published in Philips Technical Review, vol. 12, page 293, in April 1951. If, however, the levigated aluminum oxide is mixed with water instead of with kerosene—the water, if necessary, being slightly acidified—highly polished grooves are formed. According to Troelstra's definition (ibid.) this suspension in water or in acidified water constitutes a "stable suspension."

The abrasive may be applied to the surface of the sheet in a film, layer or otherwise, prior to the operation of the pads, brushes or the like. Alternatively, it may be applied to the pads or brushes themselves.

It is advisable for the pads to be somewhat flexible or resilient so that they can accommodate slight irregularities in the surface of the cellulose acetate but, apart from this, almost any type of pad can be used such as for instance strips of leather or metal, or of abrasive cloths, e.g. emery-cloth, suitably mounted on said bars or equivalent elements.

Where it is desired to leave gaps between groups of grooves, e.g. when making partially formed screen elements, the pads may be comb-shaped. For instance some plastic materials such as impregnated papers or cloths are suitable for the manufacture of such combs.

In this specification the terms "fully formed" and "partially formed" have been used in some places, and for the sake of accuracy it should be assumed that a screen is "fully formed" if at least 50% of the screen area is resolved into grooves, and that it is "partially formed" if less than 50% of the screen area is so resolved. Very satisfactory results have been achieved with fully formed screens in which about 80 to 90% of the area is resolved into grooves. The degree of formation or resolution of the screen area is controlled by the choice of the brushes, combs or like inscribing means, and for the same inscribing means it can be varied by radial adjustment of these means on their carriers during operation.

The light-efficiency of screens according to the invention can be further improved by shaping the teeth of combs so that aggregates of microscopic grooves lying in conical grooves of larger width at an angle to the surface of the sheet are formed. Such a comb is diagrammatically illustrated for instance in Fig. 13.

It is known to increase the diffusion of light from a screen by superimposing thereon parallel lenticulations at right angles to the desired direction of diffusion. Such lenticulations can be made in accordance with the present invention by means of abrasive pads substantially in the aforedescribed manner, provided that these abrasive pads are passed over the sheet surface, or over a separate transparent sheet or film superimposed upon said surface, along straight lines extending in the direction of the desired lenticulations. Here again it is essential for the grooves to be at random spacing and of random cross-section in order to avoid the creation of a colour spectrum.

The screens described in the foregoing consist of transparent material such as cellulose acetate and it will be understood that for such screens one set or more than one set of grooves can be inscribed on each side of the sheet whereby effacing, if any, of the grooves formed in each operation is avoided or reduced, respectively.

Screens as so far described are suitable for use in arrangements in which the projector or projectors on the one hand and the observers on the other hand are at opposite sides of the screen. However, the screens may be used for front projection, if backed by a mirror or other specular reflecting material.

Figure 13:
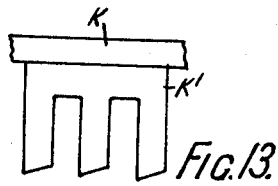

Moreover the present invention is applicable with equal advantage to projection screens made of opaque material, particularly sheet material, the surface of which may be resolved into series of concentric grooves of microscopic width, by the use of the device described with reference to Figs. 12 and 13 respectively, provided that pads, brushes or combs and abrasive substances of adequate properties are used. Such screens, of course, are not transparent and therefore cannot be superimposed, but it has been found that the different sets of concentric circles still act independently which may be due to a rounding of the corners formed at the intersection of grooves of the sets and/or to the fact that the sections of each groove between adjoining intersections are of sufficient length.

I desire it to be understood that I do not wish protection by Letters Patent to be limited to the aforedescribed details, which are capable of further modification within the scope of this invention.

Having thus described the invention, what is claimed as new and desired to be secured by Letters Patent, is:

1. A projection screen to be arranged substantially at right angles to a source of light rays, said screen comprising a transparent sheet having opposite surfaces each of which is provided with a plurality of sets of concentric circular grooves, said grooves being of a substantially constant depth, each said set being formed on a different center outside the sheet in the plane of and at a finite distance from said sheet, the grooves of each set being of random spacing and cross-section and numbering at least 2000 to the inch so as to be substantially visually indistinguishable, said sets of grooves extending entirely over said sheet surface and deflecting the light from a projector forming an image on the sheet in a manner rendering said image visible at maximum intensity mainly to observers having their eyes in conical spaces defined by extensions of lines drawn between the centers of said sets of grooves and the periphery of the lens of said projector, the axes of said conical spaces passing through the center of said lens, said conical spaces determining an area for observers viewing the projected image.

2. A projection screen according to claim 1, wherein said sheet has superposed thereon at least one additional transparent sheet, the sheets constituting conjointly a composite screen, each sheet of said composite screen being provided with at least one set of said concentric circular grooves on at least one of its surfaces, and the centers of the diverse sets of grooves being all spaced from each other and being located substantially in the plane of the composite screen beyond its confines and at finite distances therefrom.

3. A projection screen to be arranged substantially at right angles to a source of light rays, said screen comprising a transparent sheet having opposite surfaces at least one of which is provided with a plurality of sets of concentric circular grooves, said grooves being of extremely small size and of a substantially constant depth, each set having a different center in the plane of and beyond said sheet at a finite distance from the latter, the grooves of each set being of random spacing and cross-section and being indistinguishable to an observer at a predetermined distance from the sheet and said sets of grooves respectively extending entirely over said sheet surface and respectively deflecting light from a projector forming an image on the sheet in a manner rendering said image visible at maximum intensity mainly to observers having their eyes in conical spaces the apexes of which respectively coincide with the centers of said sets of grooves, the axes of said conical spaces passing through said projector, said conical spaces determining an area for observers viewing the projected image.

References Cited in the file of this patent

UNITED STATES PATENTS

| | | |
|---|---|---|
| 1,293,380 | Dugan | Feb. 4, 1919 |
| 1,370,885 | Frederick et al. | Mar. 8, 1921 |
| 2,176,154 | Shannon | Oct. 17, 1939 |
| 2,279,555 | Browne et al. | Apr. 14, 1942 |
| 2,408,496 | Watkins et al. | Oct. 1, 1946 |
| 2,412,435 | Thomte | Dec. 10, 1946 |
| 2,424,835 | Luckey et al. | July 29, 1947 |
| 2,450,237 | Indge | Sept. 28, 1948 |
| 2,508,058 | Bradley | May 16, 1950 |
| 2,510,344 | Law | June 6, 1950 |
| 2,588,373 | Erban | Mar. 11, 1952 |
| 2,780,136 | Erban | Feb. 5, 1957 |